(12) United States Patent
Soo et al.

(10) Patent No.: US 6,847,608 B1
(45) Date of Patent: Jan. 25, 2005

(54) PATH MANAGEMENT AND TEST METHOD FOR SWITCHING SYSTEM

(75) Inventors: Yeo Nam Soo, Ahnsan (KR); Kim In Tae, Anyang (KR); Kim Jong Ho, Anyang (KR); Hwang In Hwan, Inchon (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/395,206

(22) Filed: Sep. 14, 1999

(30) Foreign Application Priority Data

Sep. 18, 1998 (KR) .............................. 98-38783

(51) Int. Cl.[7] .............................................. G04R 31/08
(52) U.S. Cl. ..................... 370/228; 370/244; 370/250
(58) Field of Search ............................... 370/216–223, 370/248, 256, 254, 242; 340/825.01, 2.1, 2.23; 379/9.05, 221.01, 221.02, 221.03, 221.04; 714/4, 712, 25, 47, 48, 56, 715, 729, 736, 737, 746, 819

(56) References Cited

U.S. PATENT DOCUMENTS

| | | | | |
|---|---|---|---|---|
| 4,365,247 A | * | 12/1982 | Bargeton et al. | 340/825.01 |
| 4,679,189 A | * | 7/1987 | Olson et al. | 370/396 |
| 5,166,923 A | * | 11/1992 | Ohmori et al. | 370/249 |
| 5,193,086 A | * | 3/1993 | Satomi et al. | 370/228 |
| 5,239,537 A | * | 8/1993 | Sakauchi | 370/218 |
| 5,265,088 A | * | 11/1993 | Takigawa et al. | 370/249 |
| 5,367,562 A | * | 11/1994 | Tourbah et al. | 379/221.04 |
| 5,383,185 A | * | 1/1995 | Armbruster et al. | 370/450 |
| 5,406,401 A | * | 4/1995 | Kremer | 340/2.1 |
| 5,452,286 A | * | 9/1995 | Kitayama | 370/228 |
| 5,455,832 A | * | 10/1995 | Bowmaster | 714/712 |
| 5,659,540 A | * | 8/1997 | Chen et al. | 370/249 |
| 5,715,237 A | * | 2/1998 | Akiyoshi | 370/228 |
| 5,764,624 A | * | 6/1998 | Endo et al. | 370/218 |
| 5,875,172 A | * | 2/1999 | Tabata | 370/228 |
| 5,907,670 A | * | 5/1999 | Lee | 714/4 |
| 6,061,355 A | * | 5/2000 | Kusano | 370/236.2 |
| 6,167,025 A | * | 12/2000 | Hsing et al. | 370/216 |
| 6,181,680 B1 | * | 1/2001 | Nagata et al. | 370/248 |
| 6,442,131 B1 | * | 8/2002 | Kondo | 370/218 |
| 6,636,484 B1 | * | 10/2003 | Agrawal et al. | 370/248 |

* cited by examiner

*Primary Examiner*—Duc Ho
*Assistant Examiner*—Phuongchau Ba Nguyen
(74) *Attorney, Agent, or Firm*—Fleshner & Kim, LLP

(57) ABSTRACT

The present invention relates to a switching system, and in particular to a path management method for a switching system which is capable of periodically checking a path state of each hardware board in a switching system of a dual active structure, managing the checked state based on a database, so that an operator recognizes a change in the states of the hardware boards. In addition, the present invention provided a standby path capable of searching an actual active path at the current point based on the database. A path test method for a switching system is provided for thereby implementing a path test for an entire interval or a certain interval with respect to the active and standby paths. Therefore, in the present invention, it is possible to enhance a continuity and reliability of a service and implement an easier maintenance of the system.

5 Claims, 5 Drawing Sheets

PATH MANAGEMENT AND TEST METHOD FOR SWITCHING SYSTEM

BACKGROUND OF THE INVENTION

1. Field of the Invention

The present invention relates to a switching system, and in particular to a path management and test method for a switching system having a dual active structure.

2. Description of the Background Art

FIG. 1 is a block diagram illustrating a conventional switching system. As shown therein, the conventional switching system includes a central subsystem 100 for performing an operator matching function for a switch operation and maintenance and storing a certain program, an interconnection subsystem 200 for performing a switching function for providing a switch number interpretation function and a communication path between switching subsystems, and a plurality of switching subsystems 300 for performing a subscriber and interconnection line matching and switching function.

Each subsystem of the switching system includes a processor. An OMP (Operating and Maintenance, Processor) which is a main processor of the central subsystem 100, a SNP (Switching Network Processor) which is a main processor of the interconnection subsystem 200, and a SSP (Switching Subsystem Processor) which is a main processor of the switching subsystem 300 perform a request and response operation between processors.

In addition, the path (PCM path) through which voice or data are transmitted is provided for each device apparatus (subscribver board, interconnection line board, various switch boards, etc). In order to implement the above-described operation, the subsystem includes a device controller (not shown) which is a low level processor for controlling the device.

In the above-described conventional switching system, in order to implement a service stability, the hardware board is constructed in a dual board system for effectively transmitting data.

Therefore, an active path through which data are transmitted is set at an initial stage based on the dual board system. In the case that an error occurs in the active path, there is provided a switching system of an active/standby in which a path is automatically or manually switched to a separately provided standby path.

In the switching system of the active/standby structure, a PCM (Pulse Code Modulation) data path is formed in the active path. The thusly formed data path is switched to the standby path at the time of a dual switch by an operator or when an error occurs in the active path (board).

When a switching function is performed for the standby path, in order to implement a continuity of the services, a maintenance is required for the standby path. In the switching system of an existing active/standby structure, it is impossible to test the standby path. Only the active path is tested using a switching function to the active/standby path based on an operator's request. In addition, there is a limit in the teat path interval with respect to the active path.

In a switching system having a dual active structure which is developed to provide a more stable service compared to the switching system of the active/standby structure, a certain path is set as an active path, and the data inputted from a transmission side device is transmitted via two paths.

Therefore, at the board side, the standby path does not separately exist. However, at the receiving side device, since a data from one board is inputted, a transmission path of a valid data which reaches the receiving side device may become an active path, and the opposite path may become a standby path.

In the switching system of the dual active structure, in order to enhance a continuity of the services, a previous test function is required for the standby path. Since the active and standby paths are not previously set, it is difficult to separate each path. Therefore, it is impossible to effectively manage each path, and a certain continuity and reliability of the system are not implemented.

SUMMARY OF THE INVENTION

Accordingly, it is an object of the present invention to provide a path management method for a switching system which is capable of periodically checking a path state of each hardware board in a switching system of a dual active structure, managing a database and informing the changed state of the hardware board to an operator.

It is another object of the present invention to provide a standby path setting method which is capable of searching an actual active path at the current point based on the database.

It is another object of the present invention to provide a path test method for a switching system capable of implementing a path test for the entire intervals or a certain interval with respect to the active and standby paths.

To achieve the above objects, there is provided a path management and testing method for a switching system which includes the steps of a step, in which the device controller checks a valid path and state change for each board, for forming a database using a main processor, a step for searching the database and confirming a standby path, and a step for performing a path test for the entire interval or a certain interval with respect to the active or standby path wherein the switching system which includes a plurality of devices formed in a dual active structure, a device controller for controlling the devices, and a main processor.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be explained with reference to the accompanying drawings.

Figure 1:
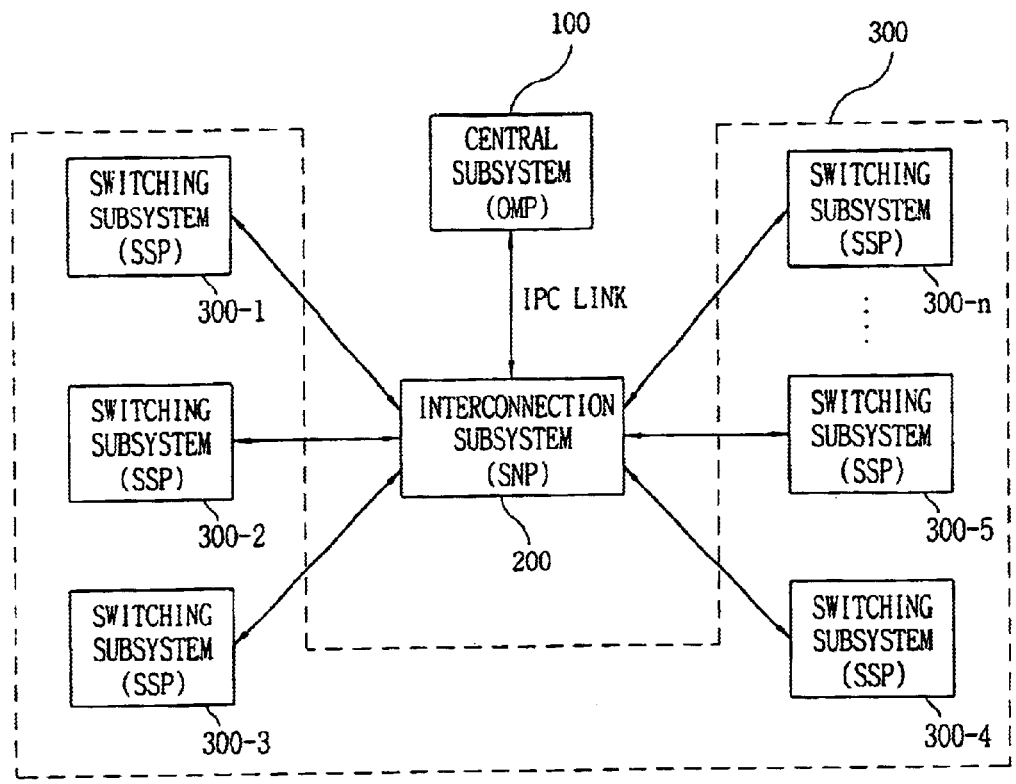
FIG. 1 is a block diagram illustrating the construction of a conventional switching system.
Figure 2:
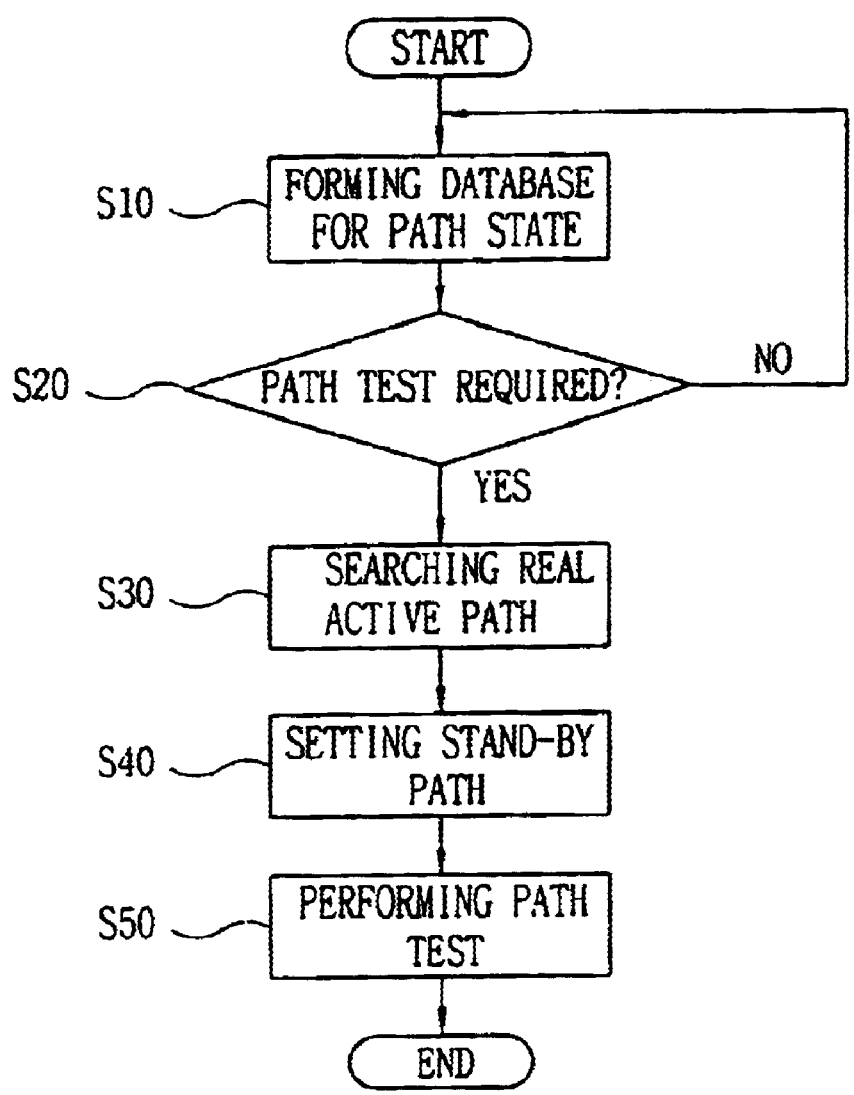
FIG. 2 is a flow chart illustrating a path management and test method for a switching system according to the present invention.
Figure 4:
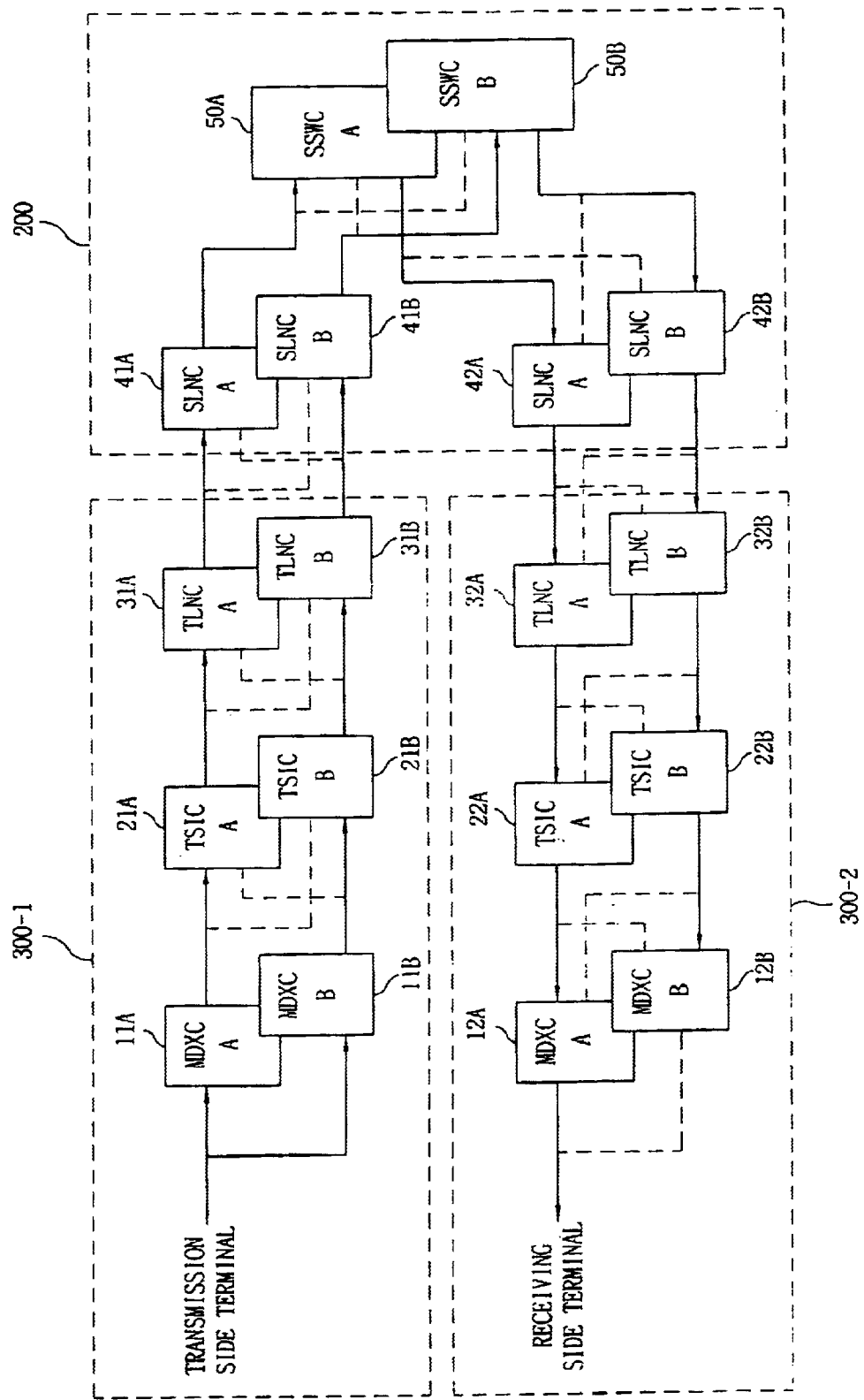
FIG. 4 is a view illustrating a hardware board construction for a switching system of a dual active structure for explaining a path setting method according to the present invention.
Figure 5:
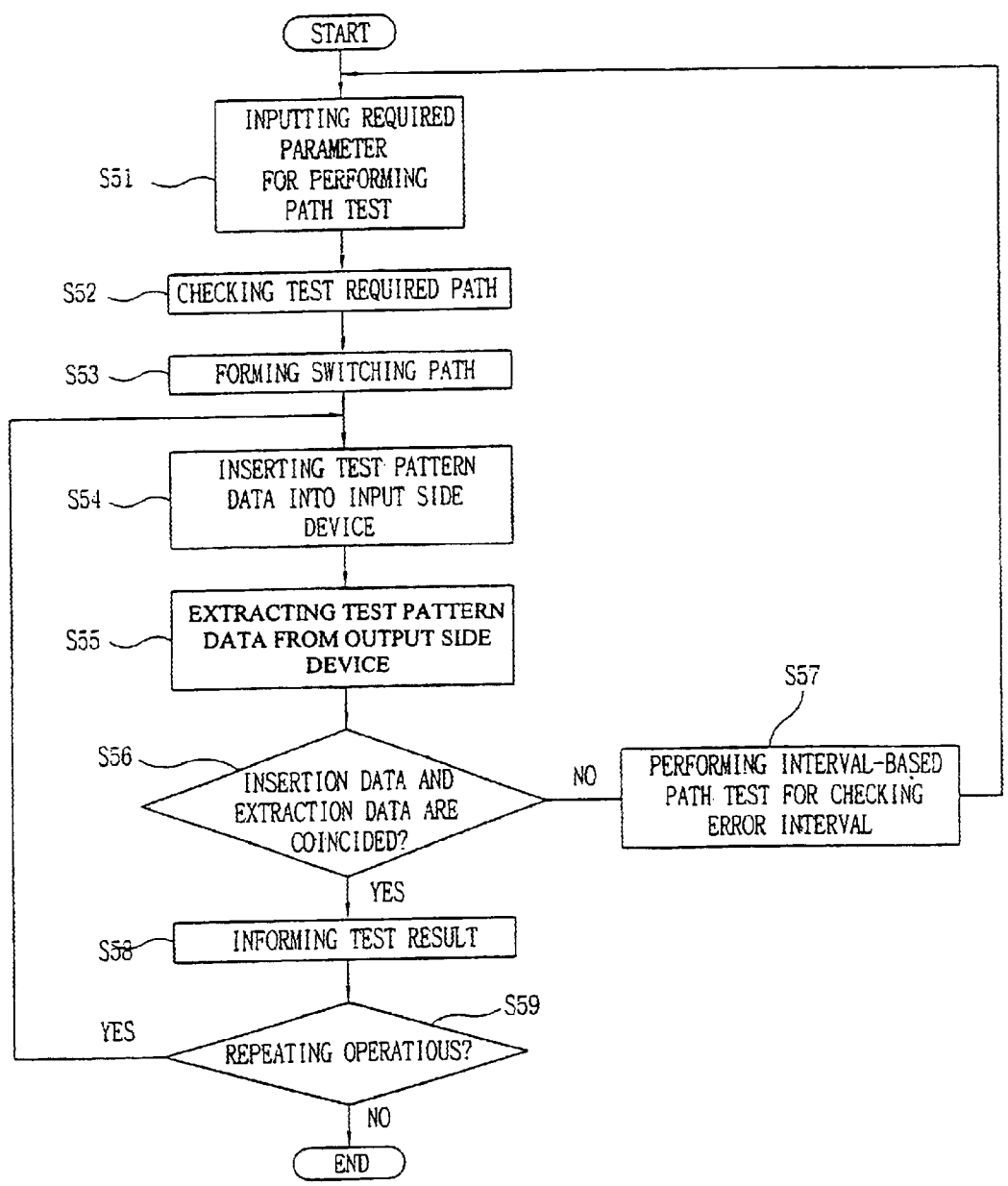
FIG. 5 is a flow chart illustrating a path test operation according to the present invention.

The construction of the switching system according to the present invention is the same as the construction of FIG. 1. FIG. 2 is a flow chart illustrating a path management and test operation for a switching system according to the present invention, FIG. 3 is a flow chart illustrating a path state database formation, FIG. 4 is a block diagram illustrating an example of a switch network construction for a switching system which is implemented by a dual active system for explaining a method for searching an actual active path, and FIG. 5 is a flow chart illustrating a test operation with respect to an active or standby path.

The path management and test method for a switching system according to the present invention will be explained with reference to FIG. 2 through FIG. 5.

As shown in FIG. 2, the path management and test method for a switching system according to the present invention includes a step S10 for forming a database for a state of each board, a step S20 for judging whether a path test request is inputted, a step S30 for searching an active path by searching a database when a path test request is inputted, a step S40 for setting a complete reverse path of the active path to a standby path, and a step S50 for performing a test operation with respect to the active or standby path.

Figure 3:
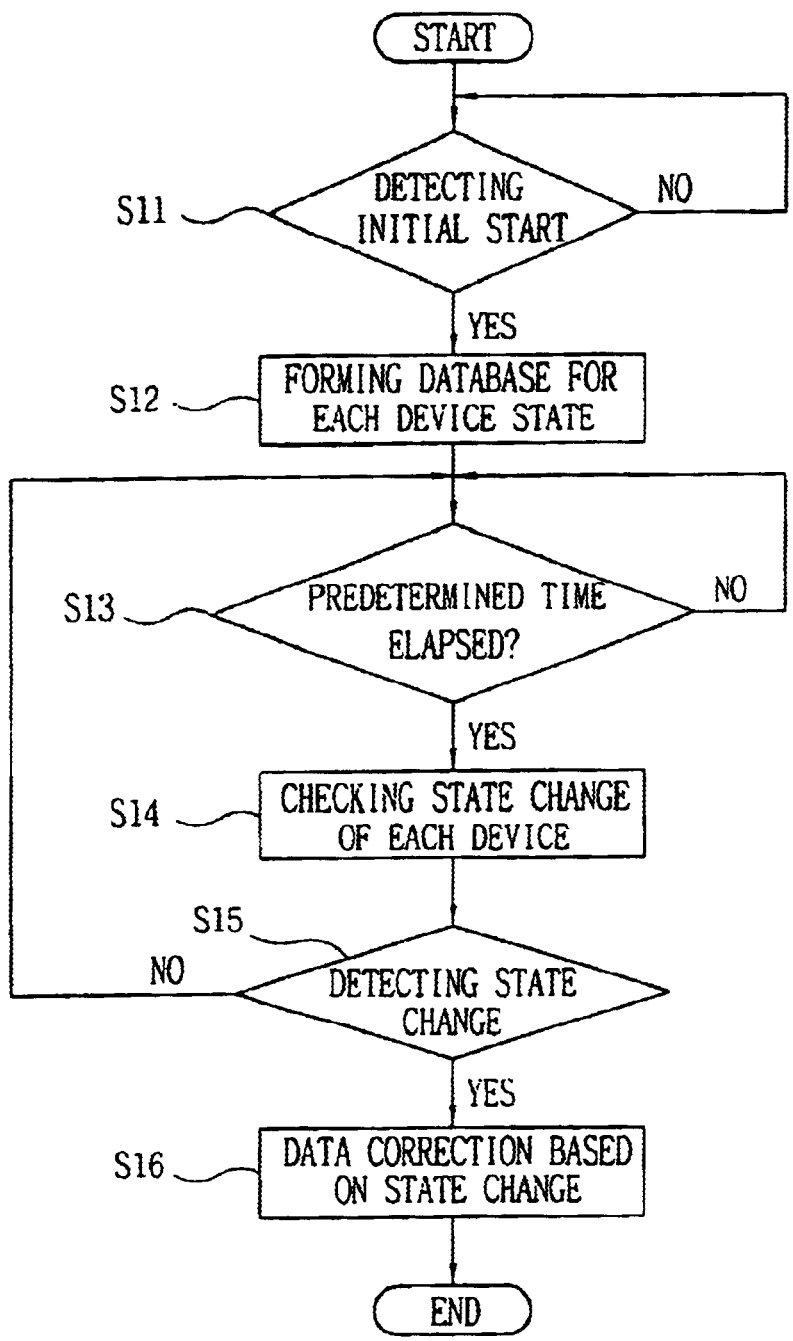
FIG. 3 is a flow chart illustrating a path state database formation according to the present invention.

As shown in FIG. 3, the database formation step S10 for each board state will be explained.

In the database formation step S10, a device controller checks a valid path state of each board which forms the switch network in an initial state step S11, and the checked state is outputted to the main processor, and the main processor forms a database for the checked state in Step S12.

After a certain time in Step S13, the device controller checks the state of each board in Step S14 is such a manner that a cycle having a certain period is registered for checking a time-based state change of a device, namely, a path change or a certain error. For example, in the present invention, a period is set as 100 msec, and the state change of the device is checked at every 10 msec.

Therefore, after a time of 100 msec, it is judged whether the state change of the device occurs in Step S15. If there is a state change, the changed state is informed of the main processor, and the data with respect to the current device state is corrected by the main processor. If there is not a state change as a result of Step S15, the routine is returned to Step S13.

The path state of the current device managed by the database may be outputted to an operator.

Here, in the database, it is possible to check the valid side of a bidirectional path based on the unit of each board. In addition, the database is formed to check the states of the board and path.

In a state that the state of the device is periodically managed, a test request is inputted with respect to the active or standby path by an operator in Step S20, an actual active path is first checked in Step S30.

With reference to FIG. 4, the method for searching an actual active path will be explained when a communication is performed between two switching sub-systems.

As shown in FIG. 4, the construction for implementing a communication from a first switching subsystem 300-1 to a second switching subsystem 300-2 via an interconnection subsystem 200 includes MDXCs (Multiplexer & Demultiplexer Card) 11A, 11B, 12A, 12B, TSICs (Time Slot Interchange Card) 21A, 21B, 22A, and 22B, TLNCs (Time Switch & Link Card) 31A, 31B, 32A, and 32B, SLNCs (Space Switch & Link card) 41A, 41B, 42A and 42B, and SSWCs (Space Switch Card) 50A and 50B which are connected at a transmission side and receiving side, respectively, in pair. FIG. 4 illustrates an example that A-side boards form an active path in the constructions of various switch networks.

The MDXC 11A, 11B, 12A and 12B are directly matched with the transmission side or receiving side terminal such as a subscriber or interconnection line, etc. The data inputted from the transmission side terminal are all applied to the MDXC-A/B 11A and 11B of the first subsystem 300-1, and the MDXC-A 12A of the second subsystem 300-2 operates in the active mode by the data outputted from the receiving side terminal. Namely, the operation is performed at 1:2 based on the MDXC 11A and 11B at the transmission side terminal, and the operation is performed at 1:1 based on the receiving side terminal of the MDXC 12A and 12B.

In other words, the operation is performed at 1:2 in the direction from the data transmitting side to the data receiving side, and the operation is performed at 1:1 in the direction from the data receiving side to the data transmitting side. Namely, the active path is searched in the sequence of the MDXC 12A, TSIC 22A and TLNC 32A of the second subsystem 300-2.

Therefore, it is possible to search an actual active path as shown by the full line of the drawings.

In the next step, the reverse path of the active path is set as a standby path in Step S40.

When the active and standby paths are set, a test is performed with respect to a certain path based on a request of the operator in Step S50. The above-described operation will be explained in more detail with reference to FIG. 5.

As shown therein, various parameters which are needed for a path test are received from the operator in Step S51. In the present invention, various parameters are used as follows. SUB1 indicates a subsystem in which a board is mounted for inserting a test pattern data. PBA1 indicates a board for inserting a test pattern data. LINK1 indicates a link number in the switching subsystem. SUB2 indicates a subsystem in which a board is mounted for extracting a test pattern data. PBA2 indicates a board for extracting a test pattern data. LINK2 indicates a link number in the switching subsystem. SIDE is a parameter for indicating whether the path to be tested corresponds to an active path ACT and a standby path SBY, and whether two paths NORM are tested, or whether a multiple channel test MULTI is performed with respect to a standby path. TYPE indicates whether a test is performed with respect to a single direction path ONEWAY or a bidirectional test LPBK is performed based on a loop-back test. DATA is a pattern data used for a test. CNTR indicates the number of repeated tests.

After the parameters which are needed for the path test are inputted, the test-requested path is confirmed based on the inputted parameters in Step S52, and the switching path which corresponds to the test path is formed in Step S53.

In addition, a test pattern data is inserted into the input side board PBA1 in Step S54, and the test pattern data is extracted from the output side board PBA1 in Step S55.

The interval-based path test is performed in Steps S51 through S56. The test is performed by variously changing the input and output side boards PBA1 and PBSA2, so that it is possible to accurately locate the interval in which an error occurred.

After Step S56 is performed, the test result is outputted, and the parameters PERD and CNTR are checked, and Steps S54 through S58 are performed as many as the operation periods PERD and the operation numbers CNTR, and then the test operation is completed.

As described above, in the switching system of the dual active structure according to the present invention, a path state of each board is checked, and an actual active path is searched. Thereafter, a standby path is set, and it is possible to test a path for the entire intervals or an interval-based path with respect to the active or standby path, so that a continuity and reliability of the service are enhanced, and it is possible to implement an easier system maintenance.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A switching system which includes a plurality of devices formed in a dual active structure, a device controller for controlling the devices, and a main processor, a path management and testing method for the switching system, comprising:

using the device controller to check a valid path and state change for each device, for forming a database using the main processor;

searching the database and confirming a standby path;

performing a path test for an entire interval or a certain interval with respect to the active or standby path wherein said path test includes:

receiving a parameter value used for the path test, forming a test path based on the parameter value, inserting a test pattern data into an input side device, extracting a test pattern data from an output side device, and judging an error with respect to the test path interval by comparing an input data and an extraction data; and performing an interval-based path test when the input data and the extracted data are different and searching for an error interval.

2. In a switching system of a dual active structure, a standby path test method, comprising:

checking an active path formed in a direction of a matched receiving board provided at a receiving side terminal, checking an active path in the reverse direction of a data transmission direction, and searching an entire active path by checking a switching path of the board connected to the active path;

setting a reverse path of the active path as a standby path; and performing a path test with respect to the set standby path, wherein said path test includes:

receiving a certain parameter value needed for the path test;

forming a switching path based on the set standby path;

inserting a test pattern data from the output side device;

judging whether there is an error in the standby path based on a comparison result with respect to the input data and the extraction data; and searching an error interval by performing an inter-based path test in the case that the input data and the extracted data are not same.

3. The method of claim 2, further comprising repeatedly performing a test by setting a number of repetitions and period.

4. The method of claim 2, wherein said parameter value indicates a test type, a board for inserting or extracting a test pattern data, a subsystem for mounting the board, a link number in the subsystem, and a pattern data used for the test.

5. The method of claim 4, wherein said parameter value indicates a test repetition period and repetition number.

* * * * *